United States Patent [19]

Tokutomi et al.

[11] 4,408,853

[45] Oct. 11, 1983

[54] FOCUS DETECTING DEVICE

[75] Inventors: Seijiro Tokutomi; Kazuo Nakamura, both of Tokyo; Kasao Jyojiki, Tsurugashima, all of Japan

[73] Assignee: Asahi Kogaku Kogyo Kabushiki Kaisha, Tokyo, Japan

[21] Appl. No.: 955,440

[22] Filed: Oct. 27, 1978

[30] Foreign Application Priority Data

Oct. 27, 1977 [JP] Japan ................................. 52/128951

[51] Int. Cl.³ ............................................... G03B 3/10
[52] U.S. Cl. ....................................................... 354/25
[58] Field of Search ................. 354/25, 31, 60 A, 195, 354/198, 199; 352/140; 355/56

[56] References Cited

U.S. PATENT DOCUMENTS

| 4,083,056 | 4/1978 | Nakamura et al. | 354/25 |
| 4,114,994 | 9/1978 | Kondo | 354/25 X |
| 4,132,888 | 1/1979 | Kondo | 354/25 X |
| 4,147,417 | 4/1979 | Mandler | 354/25 |

Primary Examiner—Michael L. Gellner
Attorney, Agent, or Firm—Sughrue, Mion, Zinn, Macpeak & Seas

[57] ABSTRACT

A focus detecting device comprising split prisms between an optical lens and an object image formed on the focal plane of the lens. The image is divided into two images and a plurality of light receiving elements or two arrays are disposed on the image forming surface. The outputs of the elements or arrays are processed to provide an electrical signal indicative of focus status.

12 Claims, 21 Drawing Figures

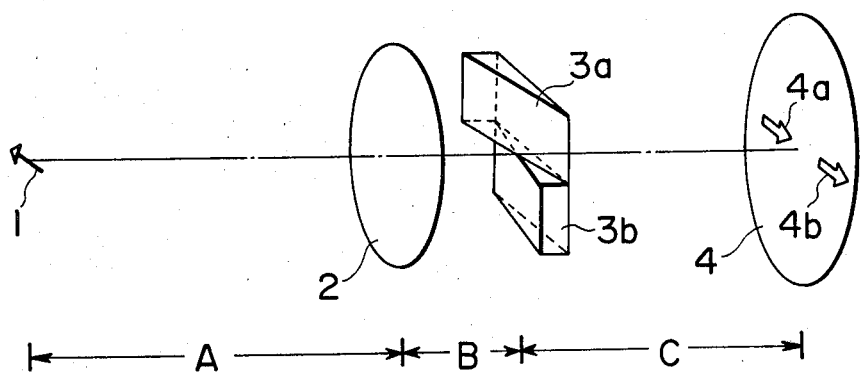
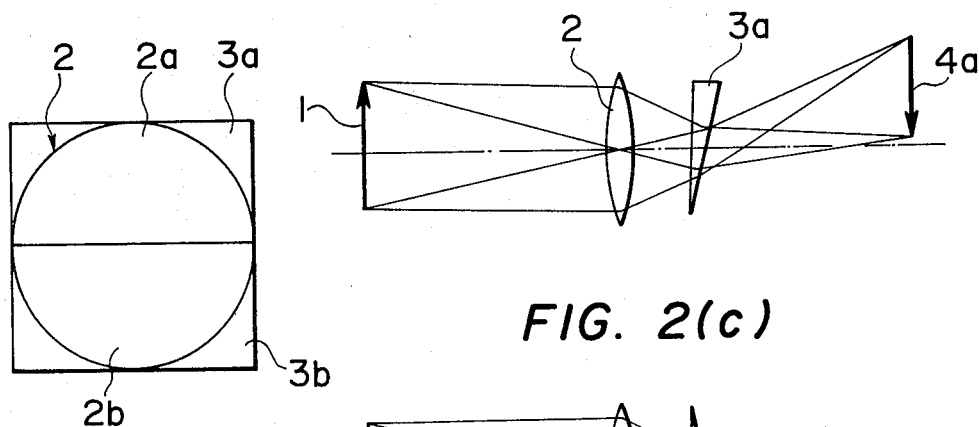
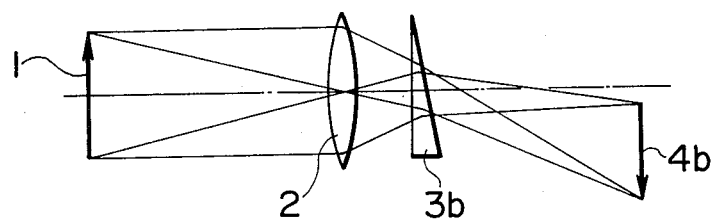

FIG. 12(a)
☐ 5a
☐ 5b
FIG. 12(b)
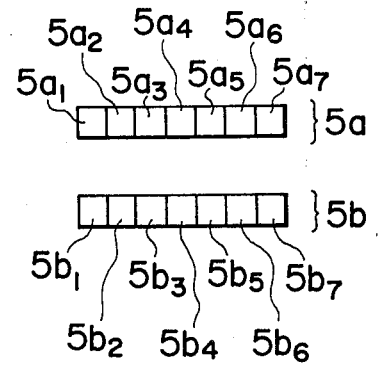
FIG. 12(c)
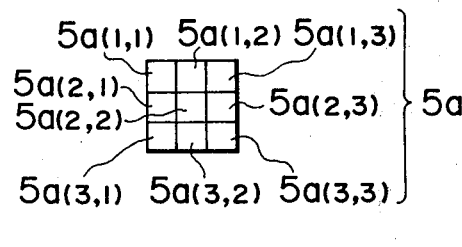
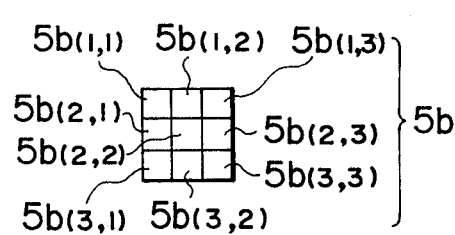
FIG. 12(d)
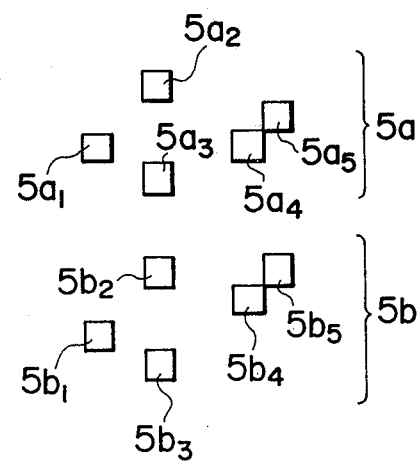

4,408,853

FOCUS DETECTING DEVICE

BACKGROUND OF THE INVENTION

This invention relates to focus detecting devices, and more particularly to a focus detecting device applied to a camera.

A variety of methods are known in the art, in which focus detecting is carried out by utilizing variations of object contrast, spatial frequency and light quantity according to focal conditions. In a first conventional method, a photo-electrical element made of CdS having a particular contrast responsive characteristic is employed. In the second method, a photo-electrical output signal which is obtained by mechanically vibrating or rotating an optical member. In the third method, similar to a range/view finder, two outputs of light detecting members provided at different positions are used to detect the completion of focus adjustment.

The first method has several disadvantages in that it is difficult to manufacture photo-electrical elements having the same light responsive characteristic. It is also difficult to detect the focus adjustment completion in the case of low light levels because variations in output of the photo-electrical element are small before and after the focal point is detected. The first method is also disadvantageous in that it is difficult to miniaturize a camera using this system because it is necessary to provide mechanically moving components. Also a relatively large amount of current is consumed if the moving components are driven electrically.

The third method has a drawback that it is difficult to exchange the lens. Contemporary cameras use interchangeable lens making this technique not commercially feasible in a large number of contemporary designs.

SUMMARY OF THE INVENTION

Accordingly, an object of this invention is to provide a practical focus detecting device in an optical system, which meets requirements of miniaturizing the optical system.

It is another object of this invention to define a focus detection system maintaining high precision, correct operation with low brightness, and operation with small electric power.

A fundamental arrangement of the focus detecting device according to this invention is made up of an optical path divider having split prisms, and light receiving elements.

A focus detecting device according to this invention comprises split prisms provided between a photographing lens and a object image formed on the focal plane of said photographing lens for dividing said object image into two images. Two light receiving elements or two arrays of light receiving elements are disposed on an image forming surface and a signal processing circuit subjects outputs of said light receiving elements or said arrays of light receiving elements to comparison to output a signal representative of focus adjustment.

When the focus adjustment is not completed, said two images are displaced in opposite directions on said light receiving elements or said arrays of light receiving elements by said split prisms, and the difference between the outputs of said two light receiving elements or the arrays of light receiving elements is not zero. When the focus adjustment is completed, the two images are provided at optically equivalent positions on said two light receiving elements or said arrays of light receiving elements and the difference between the outputs of said two light receiving elements or the arrays of light receiving elements becomes zero or an adjusted minimum value taking signal noise into account. The signal processing circuit then generates an output of a focus adjustment completion signal.

The focus detecting device according to the invention will be described in detail with reference to the accompanying drawings, in which like parts are designated by like reference numerals or characters.

BRIEF DESCRIPTION OF THE DRAWINGS

FIG. 1 is a schematic diagram showing an arrangement of an optical path divider;

FIG. 2(a) is a diagram showing the positions of a lens 2 and split prisms 3a and 3b as viewed along the optical axis;

FIG. 2(b) is a diagram showing the refraction of the optical axis by the split prism 3a and the position of an image;

FIG. 2(c) is a diagram indicating the refraction of the optical axis by the split prism 3b and the position of an image;

FIG. 12(a) is an explanatory diagram showing light receiving elements 5a and 5b;

FIG. 12(b) is an explanatory diagram showing the arrays of light receiving elements 5a and 5b, in which the light receiving elements $5a_1$ and $5b_1$, $5a_2$ and $5b_2$, . . . , $5a_7$ and $5b_7$ are at optically equivalent positions, respectively;

FIG. 12(c) is an explanatory diagram showing groups of light receiving elements disposed in matrix form, in which the light receiving elements $5a_{(1,1)}$ and $5b_{(1,1)}$, $5a_{(1,2)}$ and $5b_{(1,2)}$, . . . , $5a_{(3,3)}$ and $5b_{(3,3)}$ are at optically equivalent positions, respectively;

FIG. 12(d) is an explanatory diagram showing groups of light receiving elements disposed in random form, in which the light receiving elements $5a_1$ and $5b_1$, $5a_2$ and $5b_2$, . . . , $5a_5$ and $5b_5$ are at optically equivalent positions, respectively;

DESCRIPTION OF THE PREFERRED EMBODIMENT

Figure 3:
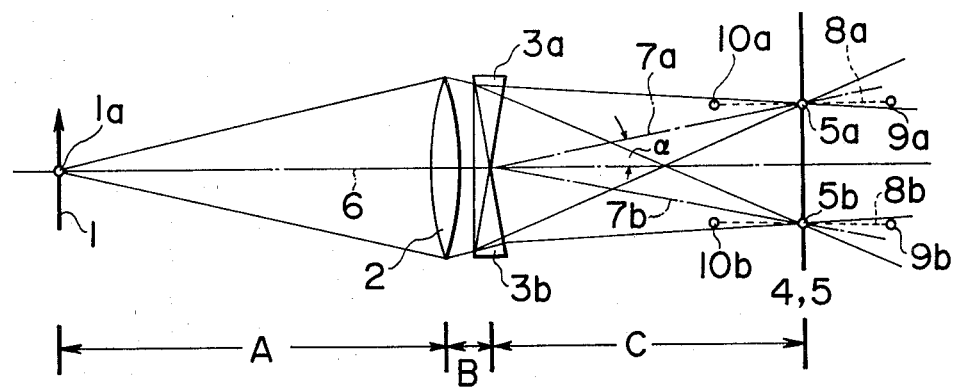
FIGS. 3, 4, 5 and 7 are schematic diagrams showing one preferred embodiment of a focus detecting device according to this invention, when the focus adjustment is completed.

Since it is conducive to a full understanding of the focus detecting system according to the invention, an optical path divider will first be described referring to a theoretical diagram of the invention. Referring now to FIGS. 1 and 2 an object 1, a lens 2, an image forming surface 4 on which the object image is formed, and split prisms 3a and 3b are shown. The split prisms are arranged in such a manner that their tops are on opposite sides. FIG. 2(a) is a diagram showing the lens 2 and the split prisms 3a and 3b as viewed from the optical axis. FIG. 2(b) is a plan view showing the optical path passing through the upper half 2a of the lens 2 as viewed from above in the optical system shown in FIG. 1, and FIG. 2(c) is a plan view showing the optical path through the lower half 2b of the lens 2 as viewed from above.

Light passing through the upper half 2a of the lens 2 passes through the split prism 3a, while light passing through the lower half 2b of the lens passes through the split prism 3b. The image brightness is reduced to $\frac{1}{2}$, but two complete images 4a and 4b are projected onto the image forming surface 4. This is because when the luminous flux from the object 1 forms the images on the image forming surface 4 via the lens 2, the luminous flux is halved by the split prisms 3a and 3b. As a result, the light passing through the split prism 3a is displaced upwardly as shown in FIG. 2(b), while the light passing through the split prism 3b is displaced downwardly as shown in FIG. 2(c).

In FIG. 1, reference character A designates the distance between the object 1 and the lens 2. Reference character B is the distance between the lens 2 and the split prisms 3a and 3b. Reference character C is the distance between the split prisms 3a and 3b and the image forming surface 4.

If the focal distance of the lens 2 is represented by $f_{(2)}$, and the optical refractive angles of the split prisms 3a and 3b are represented by $\alpha_{3a}$ and $\alpha_{3b}$, respectively, the two images formed on the image forming surface 4 are spaced by C {tan $(\alpha_{3a})$ + tan $(\alpha_{3b})$} from each other. If $\alpha_{3a} = \alpha_{3b} = \alpha$ then the distance between the two images is C {2 tan $\alpha$}. In this case, the images 4a and 4b are positioned at a distance which is optically equivalent from the object 1. Therefore, the following equation can be established as an approximation:

$$1/A + 1/(B+C) = 1/f_{(2)}.$$

If achromaticm prisms are employed as the split prisms 3a and 3b, then color dispersion of the images 4a and 4b can be prevented.

Now, the principle of detecting a focal point using the optical path divider described above will be described with reference to FIGS. 3, 4 and 5.

FIG. 3 shows one example of an optical system in a camera according to the invention. In FIG. 3, the optical axis 6 of the photographing lens 2 is shown passing through one point 1a on the object 1. It is assumed that the luminous flux from the point 1a is refracted through an angle $\alpha_{3a}$ when passing through the split prism 3a. Similarly, the lumious flux is refracted through an angle $\alpha_{3b}$ when passing through the split prism 3b, and accordingly $\alpha_{3a} = \alpha_{3b} = \alpha$.

The main optical paths of the two luminous fluxes are designated as rays 7a and 7b in FIG. 3. Two images of the object point 1 are formed at the intersections of the main optical paths 7a and 7b and the image forming surface 4. The distance between the two images is C{2 tan $\alpha$}, and the two images are disposed symmetrically with the optical axis 6. When the film surface 5 in the camera coincides with the image forming surface 4, focus adjustment is obtained. Consider then a plane 5 which is optically equivalent to the film surface 5. In this connection, light receiving elements 5a and 5b are provided at positions which are equal to the positions of the two images at the time of completing the focus adjustment. In practice, the focus adjustment of a camera is carried out by moving the position of the lens with respect to an object and the film surface is maintained stationary. However, for simplification in description, it is assumed that in this embodiment, the focal point is detected in accordance with a focus adjustment system in which the film surface is moved along the optical axis of the lens.

When focus adjustment is achieved, light from the same object point 1a reaches the light receiving elements 5a and 5b. Therefore, if the optical output characteristics of the two light receiving elements 5a and 5b are equal to each other, the outputs of those elements are equal. Since the light receiving elements 5a and 5b are optically equivalent to the film surface 5, they are displaced to the right on the dotted lines 8a and 8b in the case of a front focus and are displaced to the left in the case of a rear focus. The displacements of the light receiving elements 5a and 5b are indicated in FIG. 3 by the dotted lines 8a and 8b, respectively.

The dotted lines 8a and 8b are spaced by C tan $\alpha$ from the optical axis 6 and are in parallel with the latter 6. The positions of the light receiving elements 5a and 5b are indicated by 9a and 9b in the case of a front focus and are indicated by 10a and 10b in the case of a rear focus, respectively. In FIG. 3, when the light receiving elements 5a and 5b are at the positions 9a and 9b, or 10a and 10b, respectively, it is very difficult to analyze whether or not the outputs of the light receiving elements 5a and 5b are different from each other.

Figure 4:
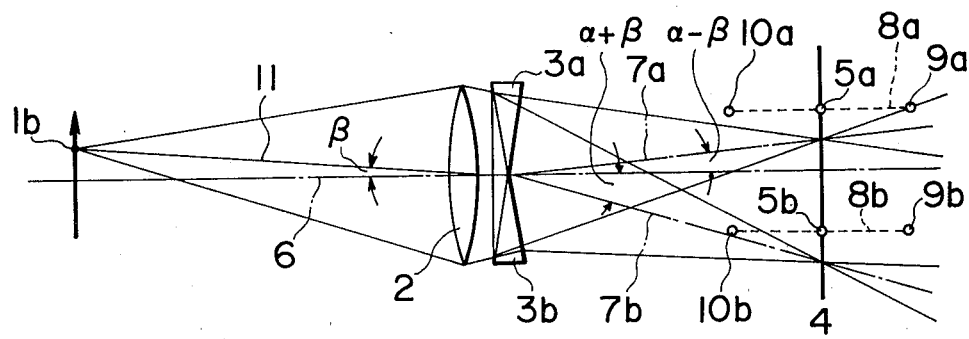

However, if an object point 1b is slightly above point 1a, as viewed in FIG. 4, the main optical axis 11 of luminous flux from the object point 1b forms an angle $\beta$ with the optical axis 6. Then the main optical axis 7a of the luminous flux passing through the split prism 3a forms an angle $(\alpha - \beta)$ with the optical axis 6 in this approximation, while the main optical axis 7b of the luminous flux pass through the other split prixm 3b forms an angle $(\alpha + \beta)$ with the optical axis 6. Therefore, light from the object point 1b is applied to the light receiving element 5a in the case of the front focus, and is applied to the light receiving element 5b in the case of the rear focus. But, it is applied to neither of the light receiving elements when the focus adjustment is completed. This can be demonstrated by the following expression:

$$C \tan (\alpha - \beta) < C \tan \alpha < C \tan (\alpha + \beta)$$

Figure 5:
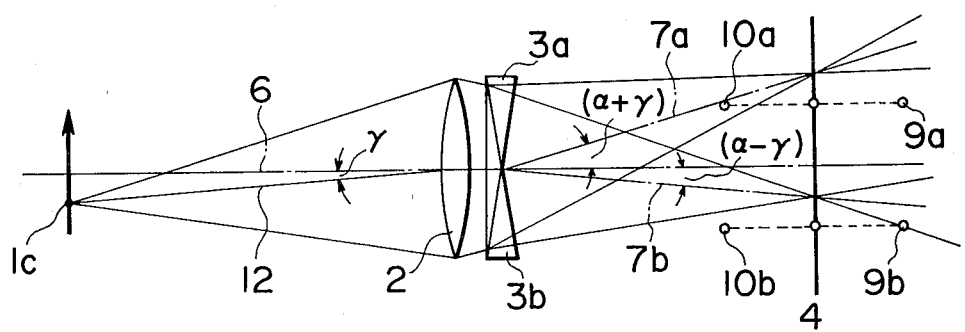

The opposite condition is shown in FIG. 5, where an object point 1c is slightly below, the object point 1a. The main optical axis of luminous flux from the object point 1c forms an angle $\gamma$ with the optical axis 6. The main optical axis 7a of the luminous flux passing through the split prism 3a forms an angle $(\alpha+\gamma)$ with the optical axis 6 in approximation, and the main optical axis 7b of the luminous flux passed through the split prism 3b forms an angle $(\alpha-\gamma)$ with the optical axis.

Therefore, in contrast to the case of FIG. 4, light from the object point 1c is applied to the light receiving element 5b in the case of the front focus and is applied to the light receiving element 5a in the case of the rear focus. This can be proved by the following expression:

$$\tan(\alpha-\gamma) < \tan\alpha < \tan(\alpha+\gamma)$$

Therefore, in the case of the front focus, light from a portion of the object 1 which is above the optical axis in FIG. 3, 4 or 5 is applied to the light receiving element 5a, while light from a portion of the object 1 which is below the optical axis is applied to the light receiving element 5b. In contrast, in the case of the rear focus, light from a portion of the object 1 which is above the optical axis is applied to the light receiving element 5b, while light from a portion of the object 1 which is below the optical axis is applied to the light receiving element 5a.

As the amount of defocus is increased, the amounts of $\gamma$ and $\beta$ are increased, and the position of the object point emitted light applied to the light receiving elements 5a and 5b is increasingly shifted from the position 1a because the image of the object point is out of focus. This is caused since, although the sectional area of the luminous flux from the object point is a minimum on the image forming surface 4 and the image point and the object point are in the correspondence ratio of 1:1, light from a number of object points is applied to one point on a plane which is out of focus. The light applied to light receiving elements 5a and 5b has particular characteristics due to defocus as described above.

Therefore, the outputs of the light receiving elements 5a and 5b are different from each other unless the object points 1a, 1b and 1c emit the same quantity of light. Thus, when the object has the contrast and the difference between the outputs of the light receiving elements 5a and 5b is zero, the focus adjustment is deemed to be completed. The principle of the invention has thus been described. However, as was described before, the camera used for describing the principle is a special one in which the film surface is moved. Therefore, an ordinary camera in which focusing is effectuated by movement of the object in the same optical system will now be briefly described with reference to FIGS. 6, 7 and 8.

Figure 6A:
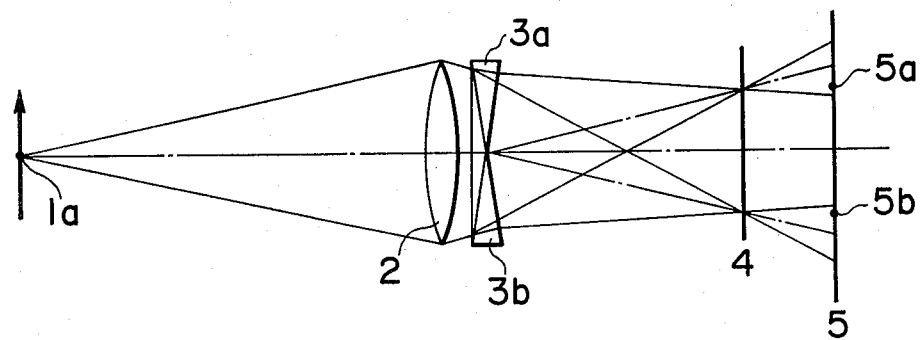
FIGS. 6 and 8 are schematic diagrams indicating the status of the preferred embodiment according to the invention when the focus adjustment is not complete.
Figure 6B:
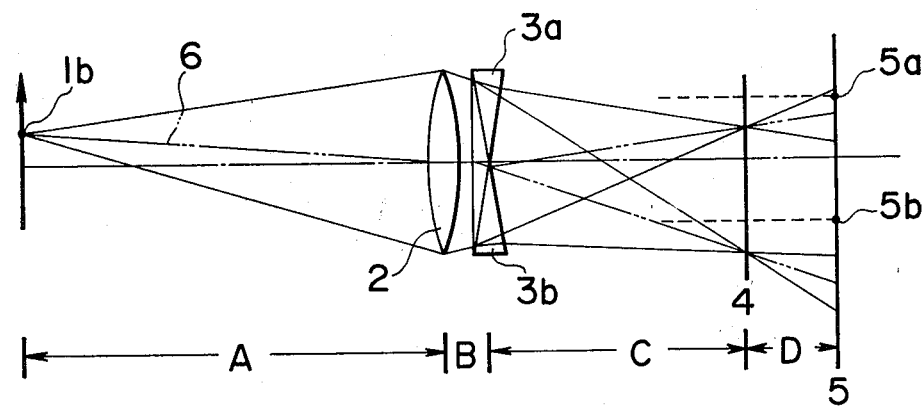
Figure 6C:
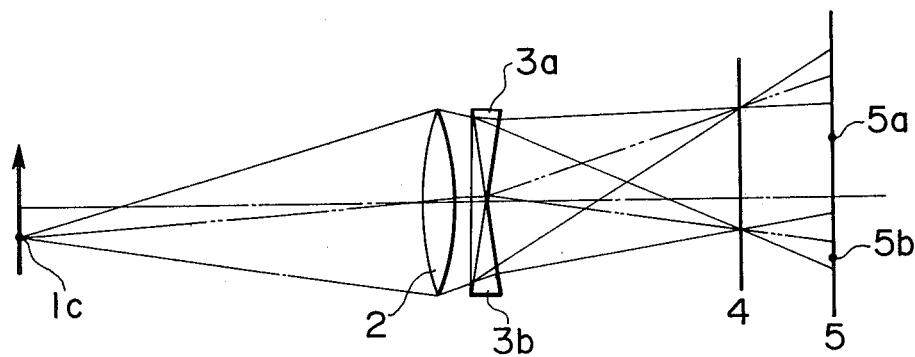
Figure 7A:
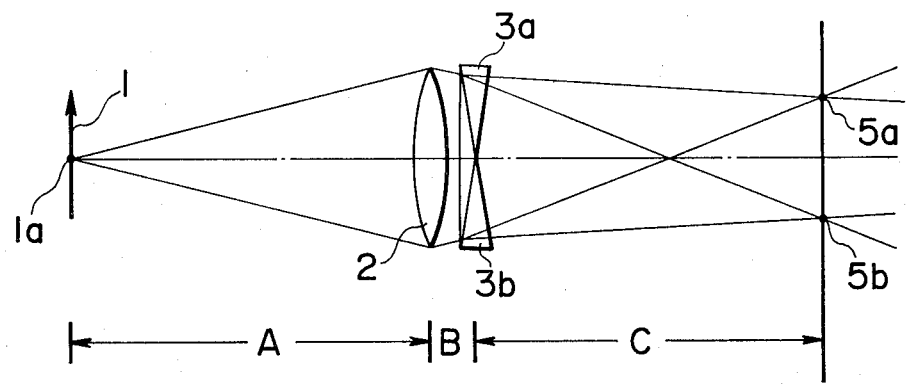
Figure 7B:
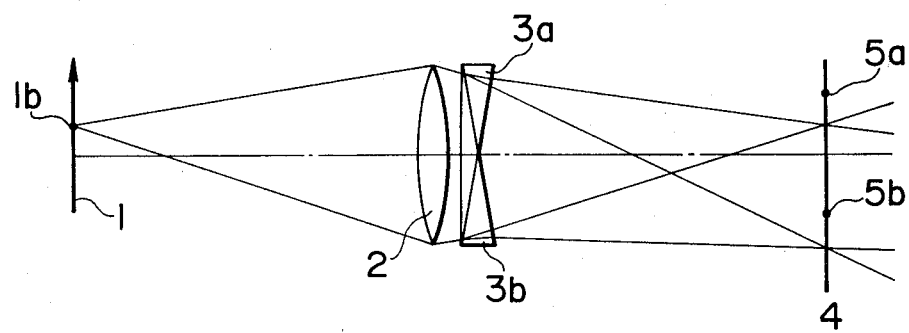
Figure 7C:
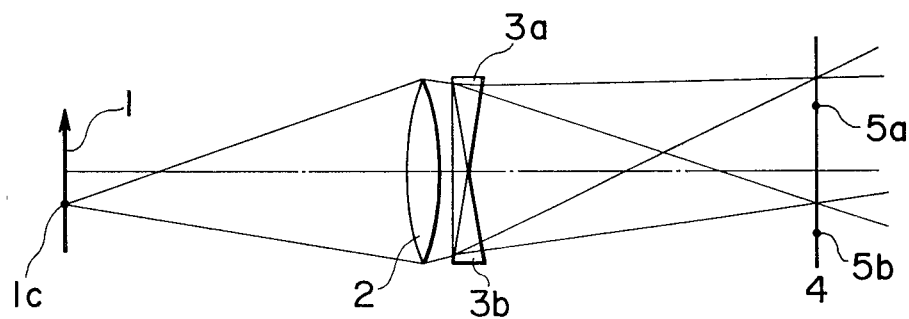
Figure 8A:
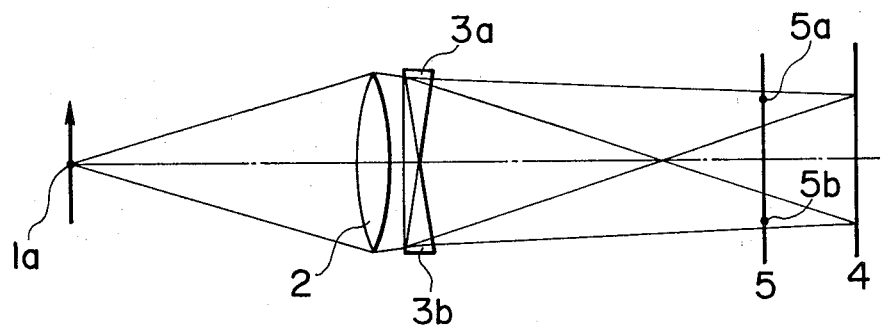
Figure 8B:
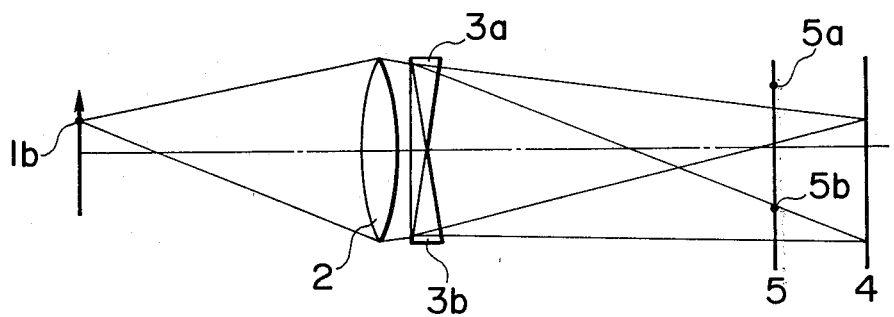
Figure 8C:
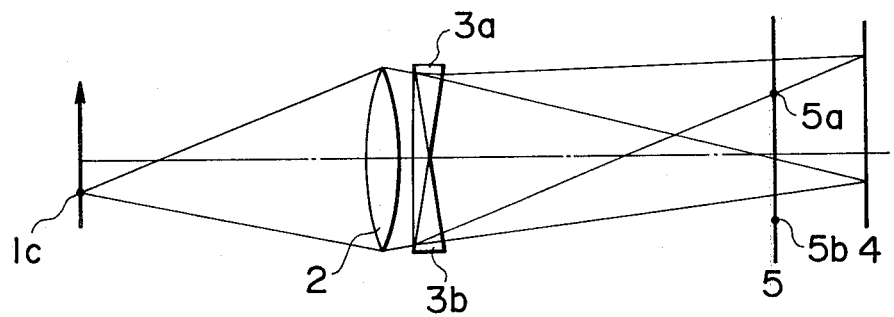

FIGS. 6(a), 6(b) and 6(c) show luminous flux from the object points 1a, 1b and 1c in the case of a front focus. FIGS. 7(a), 7(b) and 7(c) show luminous flux from the object points 1a, 1b and 1c when the focus adjustment is complete, and FIGS. 8(a), 8(b) and 8(c) show luminous flux from the object points 1a, 1b and 1c in the case of a rear focus, respectively.

Figure 9:
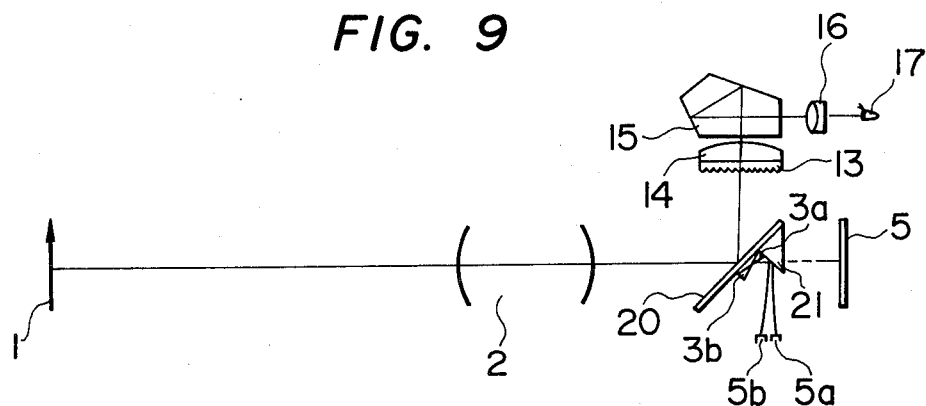
FIG. 9 is a diagram showing one application of the preferred embodiment according to the invention in a single lens reflex camera.

FIG. 9 is a schematic diagram showing one application of the device according to the invention to a single lens reflex camera, in which the optical arrangement of an object 1, a photographing lens 2, split prisms 3a and 3b and light receiving elements 5a and 5b is indentical with that shown in FIGS. 3 through 8. In FIG. 9, a half mirror is designated as element 20 and a total reflecting mirror is shown as element 21. A focusing surface 13 is positioned on a condenser lens 14. A penta-prism 15 reflects the light image on to an eyepiece 16 for viewing by the observer 17. These elements are common to single lens reflex cameras.

The focusing surface 13, the film 5 and the light receiving elements 5a and 5b are on planes which are optically equivalent to one another. When focus adjustment is achieved, the difference between the outputs of the light receiving elements 5a and 5b is zero. However, the difference is not zero when focus adjustment is incomplete, and, detecting the desired focus can be achieved by this technique.

Figure 10:
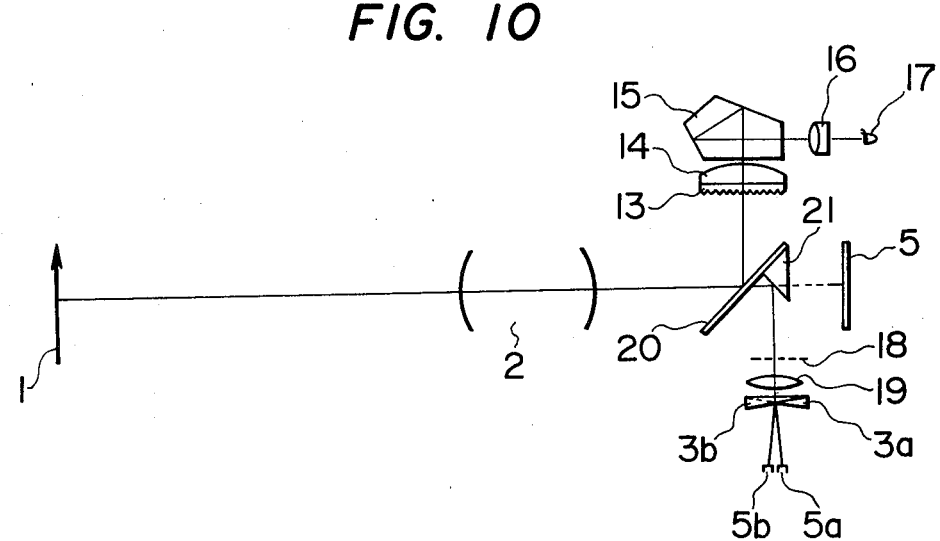
FIG. 10 is a diagram showing another application of the device according to the invention in which the lens in the optical path divider is provided separately from the photographing lens.

In the application shown in FIG. 10, a relay lens 19 is employed to improve the effect of the image divider. The distance between the relay lens 19 and the split prisms 3a and 3b is made shorter than that in the FIG. 9 case. In FIG. 10, the numeral 18 designates a plane equivalent to the film surface.

Figure 11:
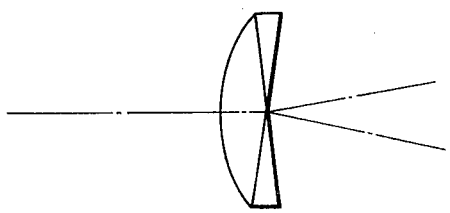
FIG. 11 is a side view showing the assembly of the lens and the split prisms of FIG. 10.

In FIG. 10, the image divider's lens is not used as the photographing lens, and therefore an optical member obtained by combining a lens and split prisms as shown in FIG. 11 can be employed, if necessary. The optical member is a combination of relay lens 19 and the split prisms 3a and 3b.

If silicon photo-diodes or silicon photo-transistors are employed as the light receiving elements 5a and 5b, the above-described focus detection system can be achieved with two light receiving elements [FIG. 12(a)]. However, the light receiving elements may be arranged in the form of arrays [FIG. 12(b)], or in matrix form [FIG. 12(c)], or in random form as shown in FIG. 12(d). If the light receiving elements 5a and 5b (hereinafter referred to as "a pair of light receiving elements" when applicable) are disposed at optically equivalent positions so that the same image is applied to both of them when the focus adjustment is complete in each of the cases shown in FIGS. 12(b)-(d). In the case of FIG. 12(b), the light receiving elements $5a_1$ and $5b_1$, $5a_2$ and $5b_2$, ..., $5a_7$ and $5b_7$ are at optically equivalent positions. In the case of FIG. 12(c) the light receiving elements $5a_{(1,1)}$ and $5b_{(1,1)}$, $5a_{(1,2)}$ and $5b_{(1,2)}$, ..., $5a_{(3,3)}$ and $5b_{(3,3)}$ are at optically equivalent positions. Finally, in the case of FIG. 12(d), the light receiving elements $5a_1$ and $5b_1$, $5a_2$ and $5b_2$, ..., $5a_5$ and $5b_5$ are at optically equivalent positions. Then, the total optical output difference between the pairs of light receiving elements is zero when the focus adjustment is complete, but it is not zero when the focus adjustment is not yet achieved. Thus, the focus detection can be achieved. If the arrangement of the light receiving elements 5a and 5b is intricate as shown in FIGS. 12(b)-(d), processing the signals becomes complicated, however, detection capability based on an object's configuration is increased.

A signal processing circuit will be described with reference to the case where each of the light receiving elements 5a and 5b is made up of one element. In this connection, the outputs of the light receiving elements 5a and 5b will be designated by "5a" and "5b", respectively. The object of the signal processing is to detect the time instant when the difference between the outputs of the light receiving elements 5a and 5b is at a zero level.

Figure 13:
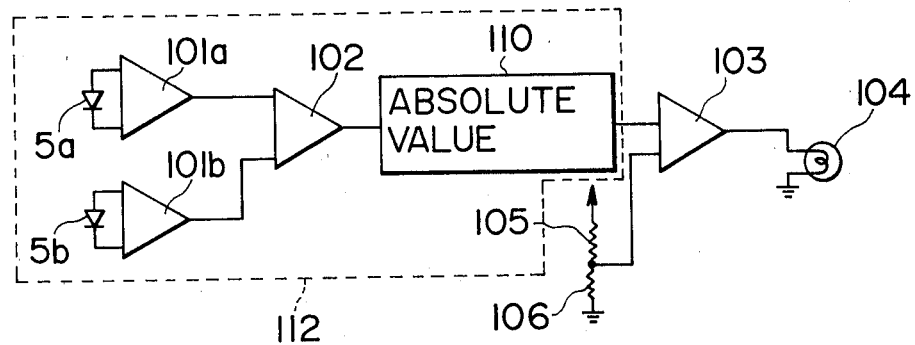
FIG. 13 shows one example of a signal processing circuit.

FIG. 13 shows one example of such a signal processing circuit. Optical output amplifier circuits 101a and 101b are provided for each of the light receiving elements 5a and 5b, to amplify the optical output to a sufficiently great signal. A differential amplifier 102 operates to amplify the difference between the outputs of the optical output amplifier circuits 101. An absolute value circuit 110 connected to the differential amplifier 102 operates to generate an output of the absolute value of the output difference. A comparator 103 connected to the absolute value circuit 110 operated to compare a comparator voltage obtained through voltage division of resistors 105 and 106 with the output of the absolute value circuit 110. In FIG. 13, reference numeral 104 designates a display unit such as a lamp to display the detection output.

Figure 14:
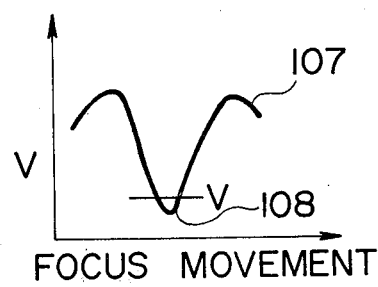
FIG. 14 is a graphical representation indicating the output of an absolute value circuit and the amount of movement of a lens.

FIG. 14 is a graphical representation indicating the output 107 of the absolute value circuit 110 and the voltage V obtained through voltage division of the resistors 105 and 106. The vertical axis is used to express the voltage while the horizontal axis being used to express the amount of movement of the photographing lens. The focus adjustment is completed at a point 108 where the output 107 becomes minimum. It should be noted that the output 107 cannot become zero because of circuit noise or the like. Hence, the point of minimum output, or below some threshold is the practical focus point. As the amount of movement of the photographing lens is further increased, away from the point 108, the output 107 is decreased. This is because the images on the two light receiving elements are not that different from each other and are "fuzzy" or not clear.

Figure 15:
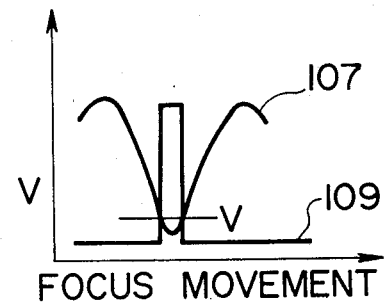
FIG. 15 is also a graphical representation showing the output of a comparator in addition to the data shown in FIG. 14.

If the comparator voltage V is suitably selected, a focus adjustment completion signal 109 can be provided as shown in FIG. 15. This is a graphical representation indicating the output 107 of the absolute value circuit 110, the comparator voltage V, and the output 109 of the comparator 103. That is, the focus adjustment is completed when the value of an expression $|5a-5b|$ becomes a minimum value. In the case where a plurality of light receiving elements 5a and a plurality of light receiving elements 5b are provided as shown in FIGS. 12(b) through 12(d), the focus adjustment is completed when the value of an expression $$\sum_{i=1}^{n} |5a_i - 5b_i|$$

becomes minimum, in which n is the number of light receiving elements forming each of the light receiving element assemblies 5a and 5b, and the contents in the absolute value symbol indicates the difference between the outputs of the paired light receiving elements.

Figure 16:
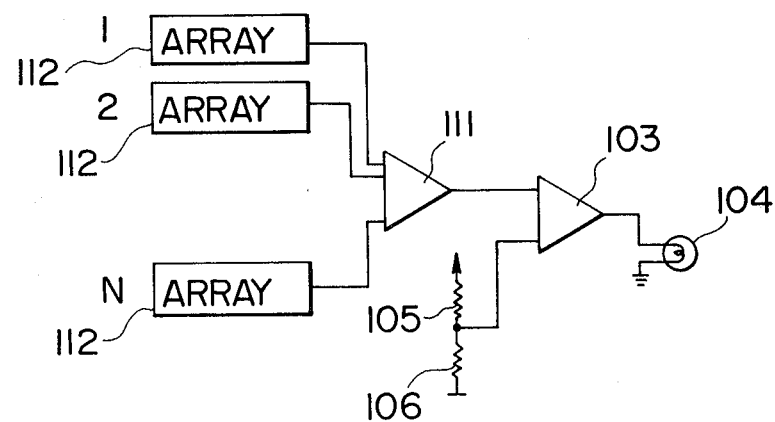
FIG. 16 is a block diagram showing another example of the signal processing circuit in which a plurality of pairs of light receiving elements are employed.

In the latter case, the amplifier circuit 101, differential amplifier 102 and absolute value circuit 110 in the circuitry shown in FIG. 13 are provided in correspondence to the number of pairs of light receiving elements. All of the outputs are applied to an adder, the output of which is compared with the comparator voltage in the comparator 103. As shown in FIG. 16, elements 112 designate the array of the components 5a, 5b, 101, 102 and 110 in FIG. 13, and reference numeral 111 designates an adder for obtaining the sum of all the output absolute values. In the circuitry shown in FIG. 16, a plurality of pairs of light receiving elements are provided instead of the light receiving elements 5a and 5b in FIG. 13.

In the arrangement according to this invention, the optical path dividing function is not affected even if the positions of the split prisms 3a and 3b and the lens 2 are reversed. If, for example, the split prisms 3a and 3b shown in FIG. 2(a) are vertically moved, the relative brightness of the divided images 4a and 4b is changed, and therefore the balance in optical quantity can be adjusted. If the split prisms 3a and 3b are moved along the optical path, the distance between the two images 4a and 4b can be varied. Furthermore, if a servo mechanism is driven by the output signal of the signal processing circuit (adapted to detect the difference between the outputs of the paired light receiving elements), then focus adjustment can be automatically completed. In addition, if a lamp or the like is turned on by utilizing the output signal, it can be ensured that the focus adjustment has been completed.

The focus detecting device according to the invention is made up of the lens, prisms and light receiving elements only, and therefore the device is light weight. Since the number of power consuming components is small, the power consumption of the device is reduced over conventional devices. The focus detecting operation is achieved at high rate with high accuracy. A principle reason for this improvement is that focus detection is achieved by utilizing the image shift and another reason is that silicon photodiodes or compound semiconductors are employed as the light receiving elements. Since split prisms are employed in the optical path divider, the construction of the focus detecting device is simple, and unlike the optical path divider utilizing the half-mirror, the device according to the invention is free of unbalance in light quantity, coloring, loss and polarization.

In addition, light quantity balance adjustment for the arrays of light receiving elements can be readily achieved. The above-described effects of the invention lead to the high detection sensitivity of the focus detecting device according to the invention.

The technical concept of the invention can be applied to not only cameras, but also optical devices such as enlargers, slide projectors and projectors. It is also apparent that changes can be made to this system without departing from the essential aspects of the invention.

What is claimed is:

1. A focus detecting device comprising:
    a lens system having an optical lens for forming an object image at a lens focal plane;
    split prism means, including first and second prisms disposed between said optical lens and said focal plane with each of said prisms receiving light passing through a different half of said optical lens, for dividing said object image into two identical images;
    at least first and second light receiving elements disposed on an image forming surface and positioned such that both are illuminated substantially equally when said lens system is focused, said first element receiving greater illumination when said optical system is out-of-focus in a first direction and said second element receiving greater illumination when said optical system is out-of-focus in a second opposite direction; and
    signal processing means receiving the output of said light receiving elements and generating an output signal indicative of focus adjustment.

2. The device of claim 1 wherein said plurality of light receiving elements comprises two arrays of elements disposed on said image forming surface in identical patterns.

3. The device of claim 1 wherein said signal processing means comprises an output amplifier associated with each element, a differential amplifier receiving the outputs of the amplifiers, an absolute value circuit to generate an output indicative of the absolute value of the output of the differential amplifier and comparator means, receiving the output of the differential amplifier and comparing it to a predetermined reference signal indicative of focus adjustment, the output of said comparator means generating said output signal indicative of focus adjustment when the differential amplifier output is at a minimum level.

4. The device of claim 2 wherein said signal processing means comprises an output amplifier associated with each element in said arrays, an array of differential amplifiers receiving the outputs of respective pairs of light elements from each array, absolute value detectors coupled to each differential amplifier, summing means to add the output of said absolute values from said absolute value detectors and comparator means receiving the output of said summing means and comparing it to a predetermined reference signal indicative of focus adjustment.

5. The device of claims 1, 3 or 4 wherein said optical lens comprises a photographing lens and said device further comprises a relay lens interposed between said photographing lens and split prism.

6. The device of claims 1, 3 or 4 wherein said split prism further comprises relay lens means associated with said split prism to improve resolution of said image divider.

7. The device of claims 1, 3 or 4 wherein said two images are identical and when the focus adjustment is not complete said two identical images are displaced in opposite directions on said light receiving elements and when focus adjustment is complete the two images are disposed at optically equivalent positions on said light receiving elements and the output of said signal processing means is at a minimum level.

8. A focus detecting device comprising: an optical lens for projecting an object image onto an image plane; a relay lens, disposed on the other side of said image plane from said optical lens, for receiving light from substantially all of said optical lens and for projecting an image of said object toward a secondary image plane; split prism, including first and second prisms, provided between said relay lens and said secondary image forming plane, each of said first and second prisms receiving light passing through a different half of said relay lens to thereby divide the object image into two secondary images; two light receiving elements disposed on said secondary image forming plane of said secondary images; and signal processing circuit means for subjecting outputs of said two light receiving elements to comparison to generate an output signal representative of the status of focus adjustment, wherein when the focus adjustment is not complete, said two secondary images are displaced in opposite directions on said two light receiving elements whereby the difference between the outputs of said two light receiving elements is not a minimum level, and when the focus adjustment is complete, said two secondary images are provided at optically equivalent positions on said two light receiving elements whereby the difference between the outputs of said two light receiving elements is at a minimum value, and said signal processing circuit means generates an output focus adjustment completion signal.

9. A focus detecting device as claimed in claim 8 in which said optical lens is a photographing lens of a single lens reflex camera, having a reflex mirror a portion of said reflex mirror made as a half-mirror, and light passing through said half-mirror is reflected by a total reflecting mirror, to thereby detect a focal point with respect to the object image formed at a position which is equivalent to a film surface.

10. The device of claim 9 wherein said plurality of light receiving elements comprises two arrays of elements disposed on said secondary image forming plane.

11. The device of claims 9 or 10 wherein said signal processing circuit means comprises an output amplifier associated with each element, a differential amplifier receiving the outputs of the amplifiers, an absolute value circuit receiving the output of said differential amplifier and comparator means comparing the absolute value circuit output with a predetermined signal.

12. The device of claim 9 wherein said signal processing circuit means further comprises an adder for combining outputs from said respective pairs of arrays of elements and comparator means receiving the output of said adder and comparing it with a predetermined signal.

* * * * *